(12) United States Patent
Myhre et al.

(10) Patent No.: US 9,793,754 B2
(45) Date of Patent: Oct. 17, 2017

(54) POWER SUPPLY SYSTEM MODULE

(71) Applicant: Eltek AS, Drammen (NO)

(72) Inventors: Erik Myhre, Asker (NO); Thomas Olsen, Asker (NO); Jan Tore Brastad, Drammen (NO); Odd Roar Schmidt, Horten (NO)

(73) Assignee: Eltek AS, Drammen (NO)

( * ) Notice: Subject to any disclaimer, the term of this patent is extended or adjusted under 35 U.S.C. 154(b) by 255 days.

(21) Appl. No.: 14/768,469

(22) PCT Filed: Dec. 20, 2013

(86) PCT No.: PCT/EP2013/077596
§ 371 (c)(1),
(2) Date: Aug. 18, 2015

(87) PCT Pub. No.: WO2014/127870
PCT Pub. Date: Aug. 28, 2014

(65) Prior Publication Data
US 2016/0006299 A1 Jan. 7, 2016

Related U.S. Application Data

(60) Provisional application No. 61/766,451, filed on Feb. 19, 2013.

(30) Foreign Application Priority Data

Feb. 19, 2013 (GB) .................................. 1302830.3

(51) Int. Cl.
H02J 7/00 (2006.01)
H02J 9/06 (2006.01)
(Continued)

(52) U.S. Cl.
CPC ................ *H02J 9/061* (2013.01); *G06F 1/30* (2013.01); *H02J 7/0068* (2013.01); *H02M 3/04* (2013.01);
(Continued)

(58) Field of Classification Search
None
See application file for complete search history.

(56) References Cited

U.S. PATENT DOCUMENTS 5,247,205 A 9/1993 Mototani et al.
6,160,379 A 12/2000 Chalasani et al.
(Continued)

FOREIGN PATENT DOCUMENTS

JP H06-70488 A 3/1994
WO 2009/028954 A1 3/2009

OTHER PUBLICATIONS

Combined Search and Examination Report for corresponding United Kingdom Application No. GB1302830.3 dated Jul. 23, 2013 (6 pages).
(Continued)

*Primary Examiner* — Cassandra Cox
(74) *Attorney, Agent, or Firm* — Osha Liang LLP

(57) ABSTRACT

A power supply system module that includes a first and second AC terminals, positive and negative DC terminals and a housing. An AC-DC converter is connected to the first and second AC terminals, and a DC-DC converter is connected between the AC-DC converter and an internal DC bus. A protection circuit is connected between the internal DC bus and the positive or negative DC terminal. A control device controls the AC-DC converter and/or the DC-DC converter. The AC-DC converter, the DC-DC converter and the control device are provided inside the housing. The power supply system module also includes a backup battery
(Continued)

device that has a backup battery connected to the internal DC bus via a battery management system. The backup battery device is provided inside the housing.

20 Claims, 8 Drawing Sheets

(51) Int. Cl.
*G06F 1/30* (2006.01)
*H02M 3/04* (2006.01)
*H02M 7/04* (2006.01)
*H01M 10/48* (2006.01)
*H01M 10/6563* (2014.01)

(52) U.S. Cl.
CPC ............ *H02M 7/04* (2013.01); *H01M 10/486* (2013.01); *H01M 10/6563* (2015.04)

(56) References Cited

U.S. PATENT DOCUMENTS

| | | | |
|---|---|---|---|
| 6,225,708 B1 | 5/2001 | Furukawa et al. | |
| 6,693,810 B2 | 2/2004 | Robinson et al. | |
| 7,855,471 B2 * | 12/2010 | Sugawara | G03G 15/80 307/46 |
| 8,344,546 B2 * | 1/2013 | Sarti | G06F 1/30 307/64 |
| 2003/0220026 A1 | 11/2003 | Oki et al. | |
| 2005/0099750 A1 * | 5/2005 | Takahashi | H02J 9/061 361/92 |
| 2007/0047100 A1 | 3/2007 | Takahashi et al. | |
| 2007/0126401 A1 | 6/2007 | Chen et al. | |
| 2007/0275271 A1 | 11/2007 | Lee | |
| 2009/0256422 A1 | 10/2009 | Fox et al. | |
| 2011/0051462 A1 * | 3/2011 | Nakamura | H02M 1/4225 363/17 |
| 2011/0162026 A1 * | 6/2011 | Lee | H04N 7/185 725/117 |
| 2012/0085109 A1 | 4/2012 | Mandarino | |
| 2015/0180232 A1 * | 6/2015 | Mino | H02J 1/08 307/23 |

OTHER PUBLICATIONS

International Search Report issued in corresponding application No. PCT/EP2013/077596 dated Apr. 16, 2014 (3 pages).
Written Opinion of the International Searching Authority issued in PCT/EP2013/077596 dated on Apr. 16, 2014 (8 pages).

* cited by examiner

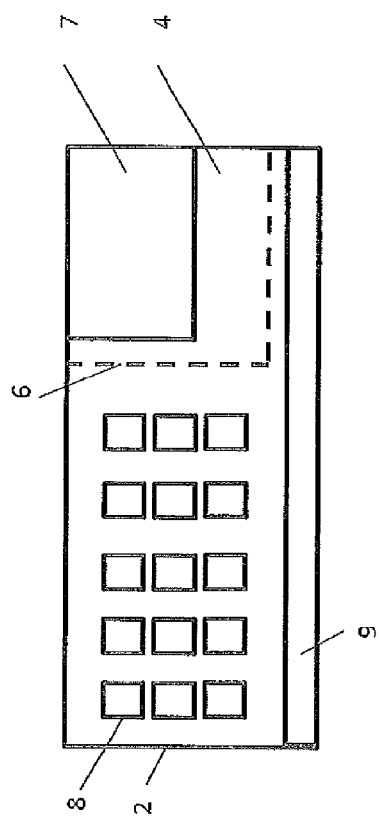
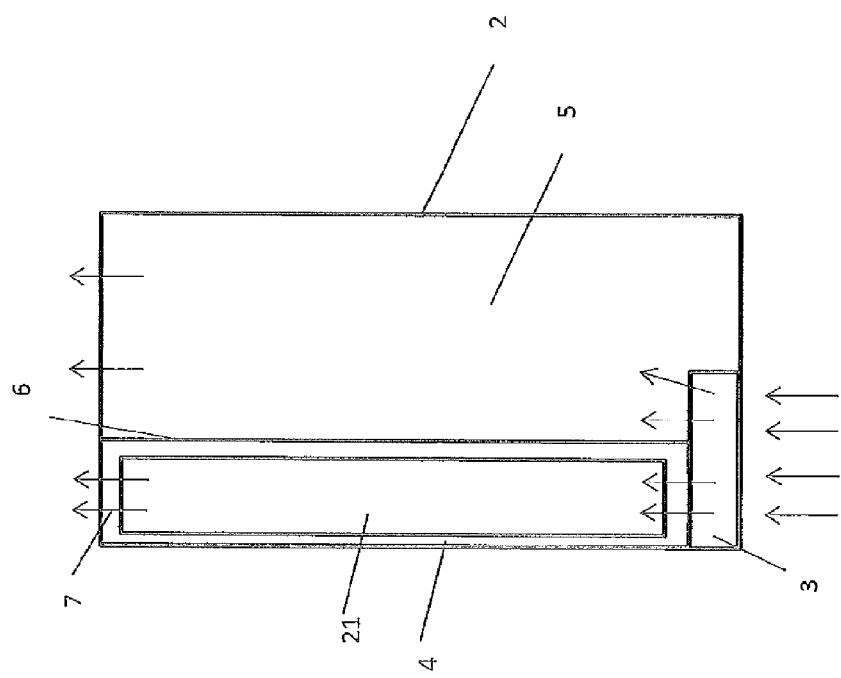

POWER SUPPLY SYSTEM MODULE

FIELD OF THE INVENTION

The present invention relates to a power supply system module.

BACKGROUND OF THE INVENTION

Power supply systems are commonly used for supplying electrical power to a load. The load is here a DC load, for example a computer server, several computer servers, a data center etc. The DC load may also be telecommunication equipment, military equipment etc. Such DC loads require a stable and reliable DC power.

In FIG. 1, a typical prior art power supply system with a power supply system module PSS is shown. The power supply system module has two AC input terminals AC1, AC2 and positive and negative DC terminals DCP, DCN. The DC terminals are connected to a DC bus which again are connected to the load.

An AC power source, typically the mains, is input to the power supply system. The power supply system module typically comprises an AC-DC converter and a DC-DC converter for providing a stable and reliable DC power to the load. One such high efficient power supply system module is known from WO 2009/028954 having a boost converter for power factor correction (PFC) and an LLC synchronous DC-DC converter. This technology is also known from the FlatPack2 HE product series, sold and marketed by Eltek ASA.

The power supply system module also comprises minimum one control circuit, typically a digital signal processor (DSP) for controlling the boost converter and the LLC converter. Each such power supply system module PSS is provided within a housing with connection interfaces for connection to a DC bus, an AC bus and possibly also a communication bus (typically based on communication bus standards, such as CAN, RS485, I2C etc).

The load may also need backup power to ensure UPS capabilities (Uninterrupted Power Supply) in case of failures in the AC mains. The backup power may comprise a DC backup, typically a battery device, supplying DC power to the DC bus. The backup power may also comprise an AC backup, for example a diesel generator, for connection to the power supply system module PSS via an AC switchgear.

In FIG. 2, a typical installation is illustrated schematically with several power supply system modules PSS connected between an AC bus and the DC bus. Several batteries are connected to the DC bus as DC backup, and several DC loads are connected to the DC bus again.

Batteries, such as lithium-ion and lead acid batteries, may explode or catch fire due to overheating, short-circuiting or over-charging. Therefore, a battery controller is needed for each battery or each group of batteries, in order to disconnect them if certain situations occur. Moreover, if one battery explodes or catches fire, there is a risk that adjacent batteries also explode due to their temperature increase caused by the first incident and cause a chain reaction.

Hence, information about battery voltage, battery current and battery temperature are normally periodically or continuously sent to the battery controller in order to monitor the status for each battery. In addition, the battery may have an incorporated safety circuit which is configured to disconnect that battery from the DC bus in order to prevent accidents. In FIG. 2, the DC backup comprises a switch for connection to and disconnection from the DC bus based on a signal from the battery controller.

Data centers may comprise a plurality of cabinets each having a plurality of power supply system modules and a plurality of DC loads in the form of servers. Such data centers are modular systems, where power supply system modules, batteries and/or servers can be added, removed or replaced dependent on the demand.

Designing power supply to a data center is challenging. There are many technical considerations that should be taken into account, for example:
  reduce space of components in order to save floor space
  reduce number of components in order to save floor space
  increase efficiency of components in order to reduce the electricity costs
  balance the need of backup batteries (data centers need a backup capacity for 30-60 seconds, using too many batteries are expensive, and using too few batteries are also expensive due to risk for increased down time for the servers)
  reduce manual work (large data centers may have as many as 2-3000 battery controllers that must be installed manually)
  increase safety by reducing risk of battery accidents, and especially to reduce the risk of several adjacent batteries failing.

The object of the invention is to provide an improved power supply system module for use in a power supply system, where the total power supply system consumes less space, which requires less time to be installed and where safety is increased.

SUMMARY OF THE INVENTION

The present invention relates to a power supply system module, comprising:
  first and second AC terminals;
  positive and negative DC terminals;
  a housing;
  an AC-DC converter connected to the first and second AC terminals;
  a DC-DC converter connected between the AC-DC converter and an internal DC bus;
  a protection circuit connected between the internal DC bus and the positive or negative DC terminal;
  a control device provided for controlling the AC-DC converter and/or the DC-DC converter;
where the AC-DC converter, the DC-DC converter and the control device are provided inside the housing;
characterized in that the power supply system module further comprises a backup battery device comprising a backup battery connected to the internal DC bus via a battery management system;
where the backup battery device is provided inside the housing.

In one aspect, the battery management system is connected to the control device.

In one aspect, the battery management system comprises a battery monitoring and control system for monitoring the status of the backup battery and for controlling the current flow between the backup battery and the internal DC bus.

In one aspect, the battery monitoring and control system is connected to the control device.

In one aspect, the battery monitoring and control system comprises a voltage sensor, a current sensor and a temperature sensor, where the sensors are connected to the control device.

In one aspect, the battery monitoring and control system comprises a charge and/or discharge current control device for controlling the charge current supplied to the backup battery from the internal DC bus during charging and/or for controlling the discharge current supplied from the backup battery to the internal DC bus during discharging, where the charge and or discharge current control device is connected to the control device.

In one aspect, the battery management system comprises a battery safety system configured to disconnect the backup battery from the internal DC bus in case safety requirements are no longer fulfilled.

In one aspect, the battery safety system comprises a voltage sensor, a current sensor and a temperature sensor, where the battery safety system further comprises a connect/disconnect device connected to the sensors, where connect/disconnect device are configured to:
  disconnect the backup battery from the internal DC bus in case specified safety limits are no longer fulfilled and
  reconnect the backup battery to the internal DC bus in case the safety requirements are fulfilled again.

In one aspect, the battery safety system is independent of the control device and the battery monitoring and control system.

In one aspect, the backup battery device is configured to supply a nominal power of the power supply system module in a period of more than 30 seconds.

In one aspect, the module comprises a cooling fan for blowing air through the housing, where the backup battery is cooled by the cooling fan.

In one aspect, the backup battery is provided in a first compartment provided within the housing, where the cooling fan is blowing air through the compartment.

In one aspect, electrical components of the AC-DC converter, the DC-DC converter and/or the control device are provided in a second compartment, where the second compartment is separated from the first compartment by a protective wall. The protective wall may be made of sheet metal or aluminum.

In one aspect, the first compartment is a closed compartment with an air inflow opening provided by the cooling fan and an air exit opening.

In one aspect, an expected lifetime for the backup battery is between 10-12 years and an expected lifetime for the AC-DC converter, the DC-DC converter and/or the control device is between 10-12 years.

In one aspect, the cooling fan is also blowing air through the second compartment of the housing.

In one aspect, a rear air exit opening is provided on the rear side of the first compartment of the housing.

In one aspect, the housing is configured to be mounted into a rack or cabinet; the first and second AC terminals are guided through the housing and are configured to be connected to an AC bus provided in the rack or cabinet; and the positive and negative DC terminals are guided through the housing and are configured to be connected to a DC bus provided in the rack or cabinet.

DETAILED DESCRIPTION

Embodiments of the invention will now be described with reference to the enclosed drawings, where:

FIG. 6a illustrates schematically the embodiment of the housing seen from above, where the upper wall has been removed;

FIG. 6b illustrates schematically the rear side of the housing;

Figure 3:
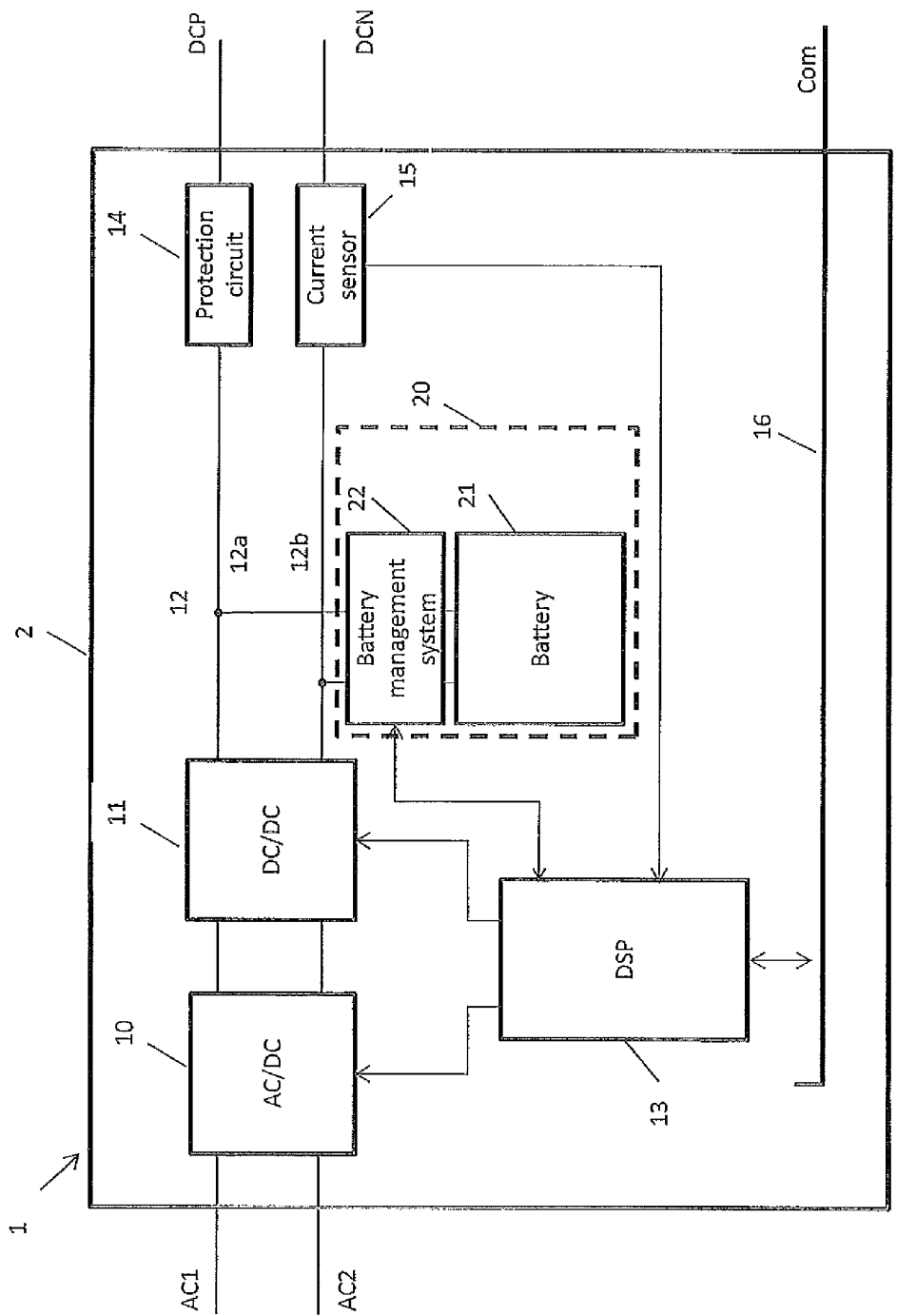
FIG. 3 illustrates a first embodiment of the present invention.

It is now referred to FIG. 3. Here it is schematically shown a power supply system module 1. The power supply system has two AC terminals, hereinafter referred to as first and second AC terminals AC1, AC2 and two DC terminals, hereinafter referred to as positive and negative DC terminals DCP, DCN. It is also shown that the module 1 comprises a communication terminal Com.

The power supply system module 1 is primarily designed for use in a power supply system with many such modules. However, the power supply system module 1 may also be used alone, connected between one AC power source and one or several DC loads.

The module 1 comprises a housing 2. The housing 2 is configured to be mounted into a rack or cabinet, together with other modules 1 and/or other electrical equipment, for example computers, telecommunication equipment etc. In such cases, the first and second AC terminals AC1, AC2 are guided through the housing 2 and are configured to be connected to an AC bus provided in the rack or cabinet. The positive and negative DC terminals DCP, DCN are guided through the housing 2 and are configured to be connected to a DC bus provided in the rack or cabinet. The communication terminal Com is also guided through the housing and is connected to a communication bus. Typically, the above terminals are provided as connectors on the same, typically rear, side of the housing 2 for connection to respective bus connectors when they are inserted into the rack or cabinet.

The module 1 further comprises an AC-DC converter 10, a DC-DC converter 11 and a protection circuit 14.

The AC-DC converter 10 is connected to the first and second AC terminals AC1, AC2. The AC-DC converter 10 is converting the AC voltage from the AC terminals to an intermediate DC voltage which then is supplied into the DC-DC converter 11.

The DC-DC converter 11 connected between the AC-DC converter 10 and an internal DC bus 12.

The AC-DC converter 10 may for example be a bridgeless boost converter. The DC-DC converter 11 may for example be a LLC converter. The control device 13 is provided for controlling switches of the AC-DC converter 10 and the DC-DC converter 11. The control device 13 is typically minimum one digital signal processor (DSP). The converters 10, 11 and the control of their switches are known from the FlatPack2 HE product sold, produced and marketed by Eltek AS. The converters 11, 12 are also known from WO 2009/028954. Consequently, they are considered known for a skilled person and will not be described in detail here.

A protection circuit 14 is connected between the internal DC bus 12 and the positive or negative DC terminal DCP, DCN in order to protect the electronic components of the converters 10, 11 from a short circuit. In FIG. 3, it is shown that the protection circuit 14 is connected between a positive bus bar 12a of the internal DC bus 12 and the positive DC terminal DCP. The protection circuit 14 may be a fuse, a diode or a MOSFET transistor etc.

A current sensor 15 is also connected between the internal DC bus 12 and the positive or negative DC terminal DCP, DCN. In FIG. 3, it is shown that the current sensor 15 is connected between a negative bus bar 12b of the internal DC bus 12 and the negative DC terminal DCN. The current sensor 15 is connected to the control device 13. The current measured by the current sensor 15 is used by the control device 13 to control the switches of the converters 10, 11 and hence to control the output current of the module 1.

The communication terminal Com is in the present embodiment connected to the control device 13 via a communication bus 16. In this way, the control device 13 may communicate with other modules 1 directly, or via a central control unit (denoted 50 in FIG. 8b).

The AC-DC converter 10, the DC-DC converter 11 and the control device 13 are provided inside the housing 2. In practice, all of the above electrical components are provided inside the housing 2, except from the terminals AC1, AC2, DCP, DCN and Com, which are guided through the housing 2, as described above.

In the present embodiment, the power supply system module 1 further comprises a backup battery device 20. The backup battery device 20 comprises a backup battery 21, which is connected to the internal DC bus 12 via a battery management system 22. As shown in FIG. 3, the backup battery device 21 has two terminals, one connected to the positive bus bar 12a, and one connected to the negative bus bar 12b via the battery management system 22. The backup battery device 20 is provided inside the housing 2. It should be noted that the backup battery 21 may comprise one backup battery or a group of backup batteries.

In FIG. 3 it is shown that the battery management system 22 is connected to the control device 13.

Figure 4:
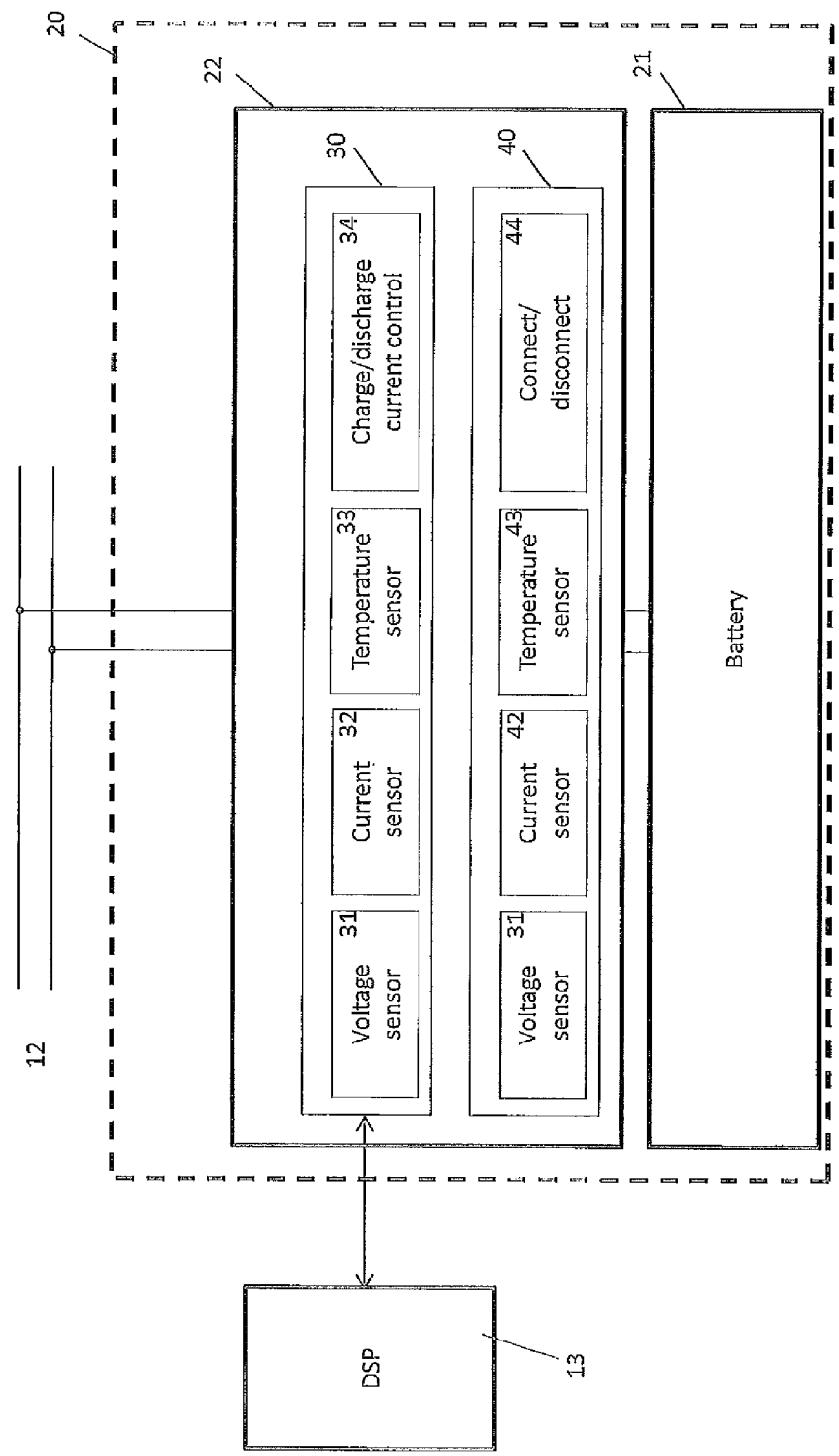
FIG. 4 illustrates the backup battery device of FIG. 3.

It is now referred to FIG. 4. In the present embodiment, the battery management system 22 comprises a battery monitoring and control system 30 for monitoring the status of the backup battery 21 and for controlling the current flow between the backup battery 21 and the internal DC bus 12. Here, it is the battery monitoring and control system 30 which is connected to the control device 13. The battery monitoring and control system 30 may comprise a voltage sensor 31, a current sensor 32 and a temperature sensor 33, where the sensors 31, 32, 33 are connected to the control device 13. Hence, if certain operating conditions are detected by the sensors 31, 32, 33 (for example voltage or current or temperature is above a threshold value), it is possible for the control device 13 to control the converters 10, 11 according to these operating conditions. Hence, if a dangerous situation occurs (for example if the temperature is increasing above a certain limit), the DC-DC converter 11 and/or the AC-DC converter 10 may be controlled by means of the control device 13 such that no current is supplied to the internal DC bus 12 from the AC side. In many cases this will reduce the temperature of the battery. Such an embodiment is most suitable when the module 1 is used alone in a power supply system.

If several modules 1 are used in parallel in a power supply system, the battery monitoring and control system 30 may also comprise a charge and/or discharge current control device 34 for controlling the charge current supplied to the backup battery 21 from the internal DC bus 12 during charging and/or for controlling the discharge current supplied from the backup battery 21 to the internal DC bus 12 during discharging. In this case, the switches of the converters 10, 11 are not used to control the charge/discharge of the backup battery 21.

Hence, the main purpose of the battery monitoring and control system 30 is to ensure optimal conditions for the backup battery device 21 in order to improve the effective operating life of the backup battery device 21.

The charge and or discharge current control device 34 may be connected to the control device 13. Hence, ensuring optimal conditions for the backup battery device 21 can be controlled by the control device 13. Also if the abovementioned dangerous situation occurs, the control device 13 may turn off the current supplied to the backup battery device 21 by means of the charge and/or discharge current control device 34.

The above embodiment may be used for all types of rechargeable batteries, such as lead-based batteries, Lithium-based batteries etc.

As mentioned in the introduction, Lithium-Ion-based batteries may be particularly dangerous when overheated. If such a battery device 21 is used, the battery management system 22 may comprise a battery safety system 40 configured to disconnect the backup battery 21 from the internal DC bus 12 in case safety requirements are no longer fulfilled. The battery safety system 40 may be integrated in, or external to, the backup battery device 21 itself. The battery safety system 40 may comprise a voltage sensor 41, a current sensor 42 and a temperature sensor 43. The battery safety system 40 may further comprise a connect/disconnect device 44 connected to the sensors 41, 42, 43. The connect/disconnect device 40 are configured to disconnect the backup battery 21 from the internal DC bus 12 in case safety requirements are no longer fulfilled and to reconnect the backup battery 21 to the internal DC bus 12 in case the safety requirements are fulfilled again.

It should be noted that the battery safety system 40 is independent of the control device 13 and the battery monitoring and control system 30.

In a preferred embodiment, the backup battery 21 is configured to supply a nominal power of the power supply system module in a period of more than 30 seconds.

Figure 5:
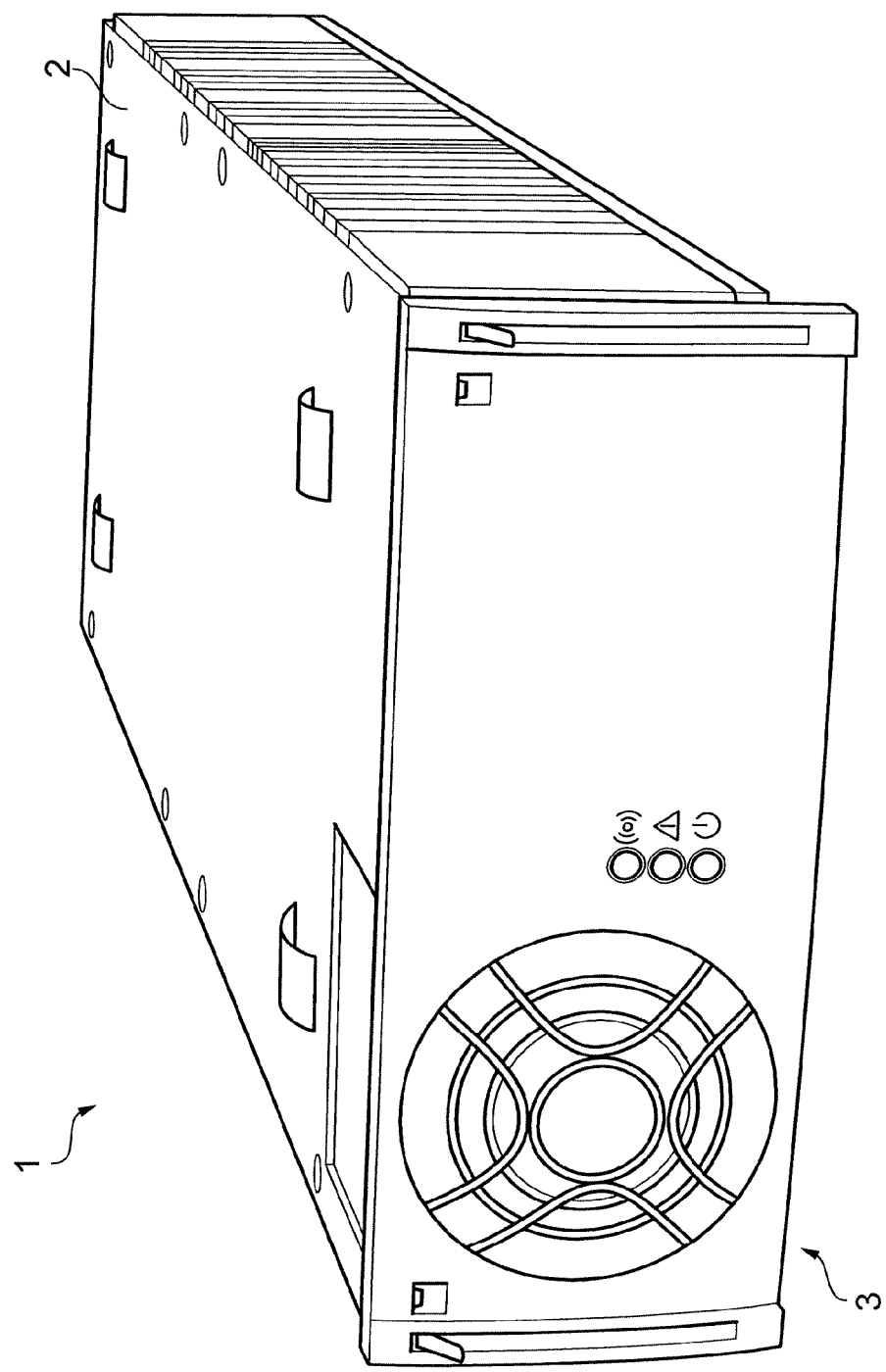
FIG. 5 illustrates an embodiment of the housing of the present invention.

It is now referred to FIGS. 5, 6a and 6b. Here, it is shown that the module 1 comprises a cooling fan 3 for blowing air through the housing 2. The cooling fan 3 is here provided on the front side of the housing 2. Preferably, the backup battery device 21 is located in the proximity of the cooling fan 3, so that the air flow provided by the cooling fan 3 can be used to cool the backup battery device 21.

In FIGS. 6a and 6b, it is shown that the backup battery device 21 is provided in a first compartment 4 provided within the housing 2. The first compartment 4 is here a longitudinal compartment inside the housing from the fan 3 in the front end to a rear air exit opening 7 provided on the rear side of the first compartment 4 of the housing 2. Hence, the cooling fan 3 is blowing air through the compartment 4.

Accordingly, other electrical components of the module 1, such as electrical components of the AC-DC converter 10, the DC-DC converter 11 and/or the control device 13, are provided in a second compartment 5 inside the housing 2. The second compartment 5 is separated from the first compartment 4 by a protective wall 6. The protective wall 6 is preferably a metal wall, for example made of steel, aluminum etc. The protective wall 6 may also have cooling fins. The purpose of the protective wall 6 is that if the backup battery device 21 gets overheated, damages to the components of the second compartment 5 should be minimized. In particular, a short circuit between the DC side of the module and the AC side of the module should be avoided. Hence, even if an explosion of the backup battery device 21 occurs, the smoke and heat should substantially exit through the opening 7. It should be noted that in FIG. 6b, the opening 7 is provided with a distance from the connector area 9, where the AC terminals, DC terminals and communication terminal are located. The protective wall may made of sheet metal or aluminum or another suitable material.

As is known for a skilled person, the rear side of the housing 2 as shown in FIG. 6 may also comprise air exit openings 8 allowing air to exit from the second compartment 5.

In FIG. 6a, the air flow through the first and second compartments 4, 5 of the housing 2 is schematically indicated by arrows. As shown, the fan 3 is blowing air from the front side of the module 1 to the rear side of the module 1 through the first and second compartments 4, 5.

It should be noted that the expected lifetime for the backup battery 21 preferably is substantially equal to the expected lifetime for the AC-DC converter 10, the DC-DC converter 11 and the control device 13. According to this, it is possible to improve the protection of the electric components and circuitry in the second compartment from damages caused by the backup battery in the first compartment 4. The improved protection can be achieved by providing the first compartment 4 as a closed compartment with only an air inflow opening provided by the cooling fan 3 on the front side of the module 1 and the air exit opening 7 on the rear side of the module 1. Hence, there is no larger opening making it possible to replace the backup battery 21 in a simple way. As shown in FIG. 6b, the exit opening 7 is smaller than the cross sectional area of the first compartment 4.

The "expected lifetime" of the electronic and electric components of the module 1 is the expected time before failure for the module in continuous operation under nominal operating conditions such as typically 2 or 3 kW power at 230 AC input and −48V DC output at an average ambient temperature of 40°, according to IEC 61508 part 2 and Telecordia SR332. The expected lifetime will typically be between 10-12 years.

According to this, it is achieved that the number of components needed for the overall power supply system is reduced, since the module 1 contains both the converter components and the backup battery 21 together with the battery management system 22. Moreover, there is an inherent balance between the need of backup batteries and the need of converter capacity. In addition, manual work is reduced, since no battery controllers must be installed. The battery controllers are now incorporated and preconfigured as a part of the module 1.

Figure 8B:
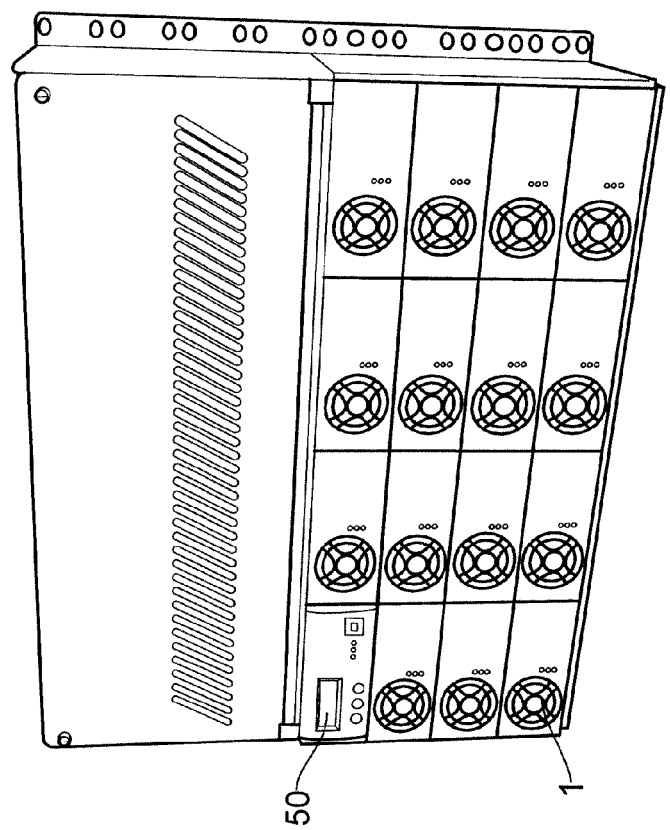
FIG. 8b illustrates how power supply system modules can be arranged in such a cabinet.
Figure 8A:
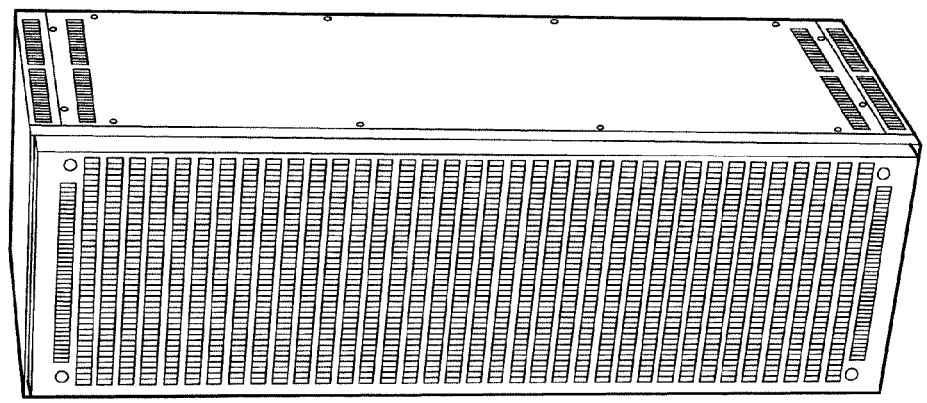
FIG. 8a illustrates a cabinet wherein power supply system modules can be inserted.

It is now referred to FIG. 8a, where a prior art cabinet is shown. In FIG. 8b, an example of how modules 1 can be arranged within a cabinet, rack or other type of enclosure is shown. Here, there are fifteen modules 1 inserted into three shelves of the cabinet, together with one central control unit 50.

Figure 1:
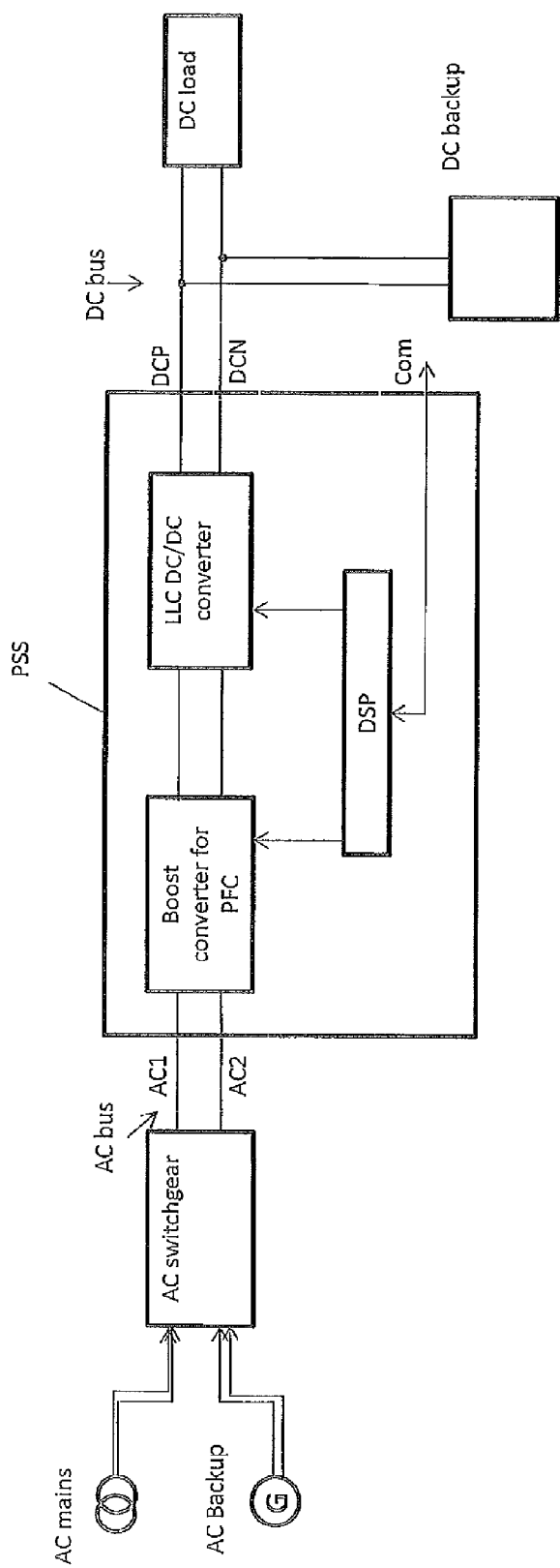
FIG. 1 illustrates a prior art power supply system connected between AC power sources, a DC load and a battery.
Figure 2:
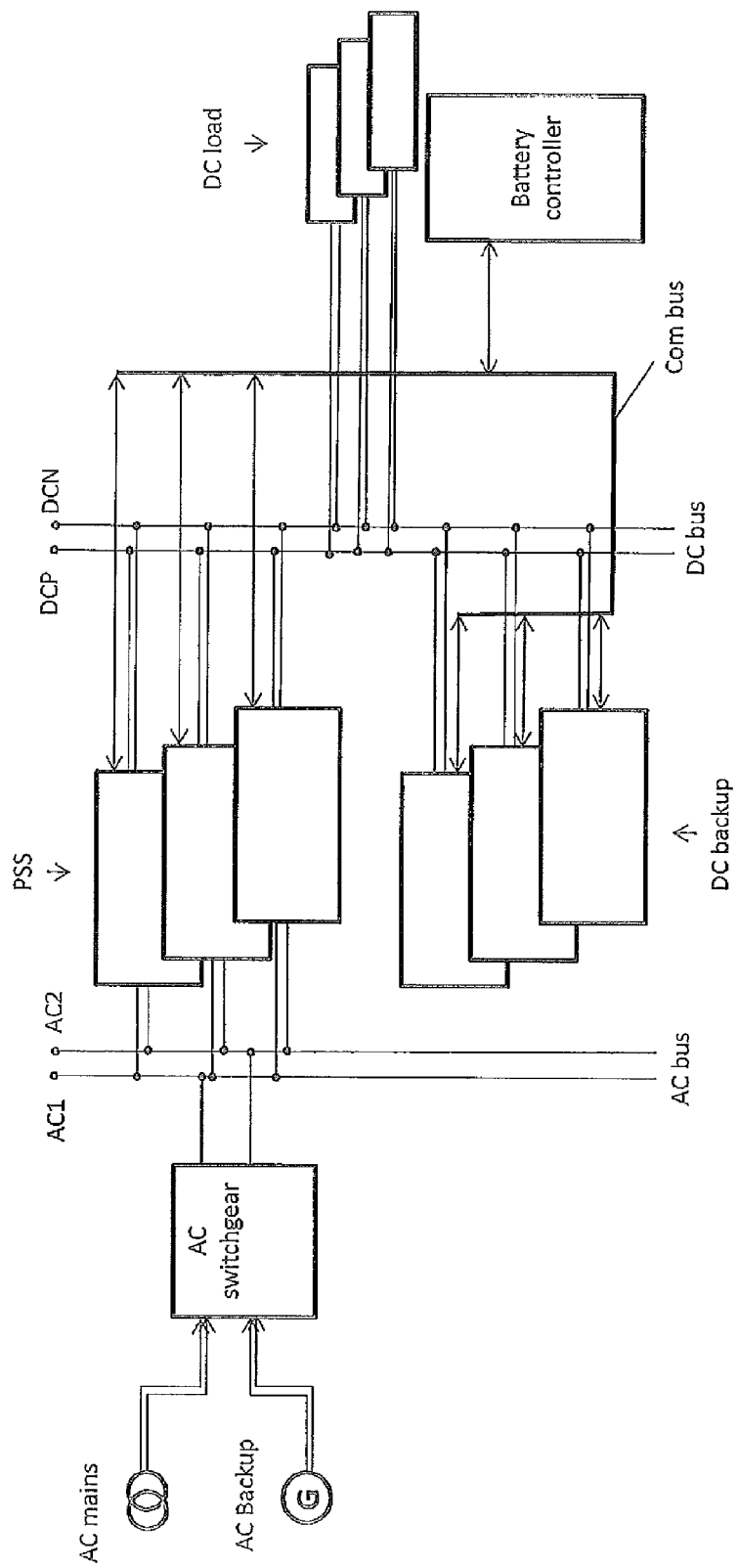
FIG. 2 illustrates how prior art use power supply systems are connected to several loads and several batteries.
Figure 7:
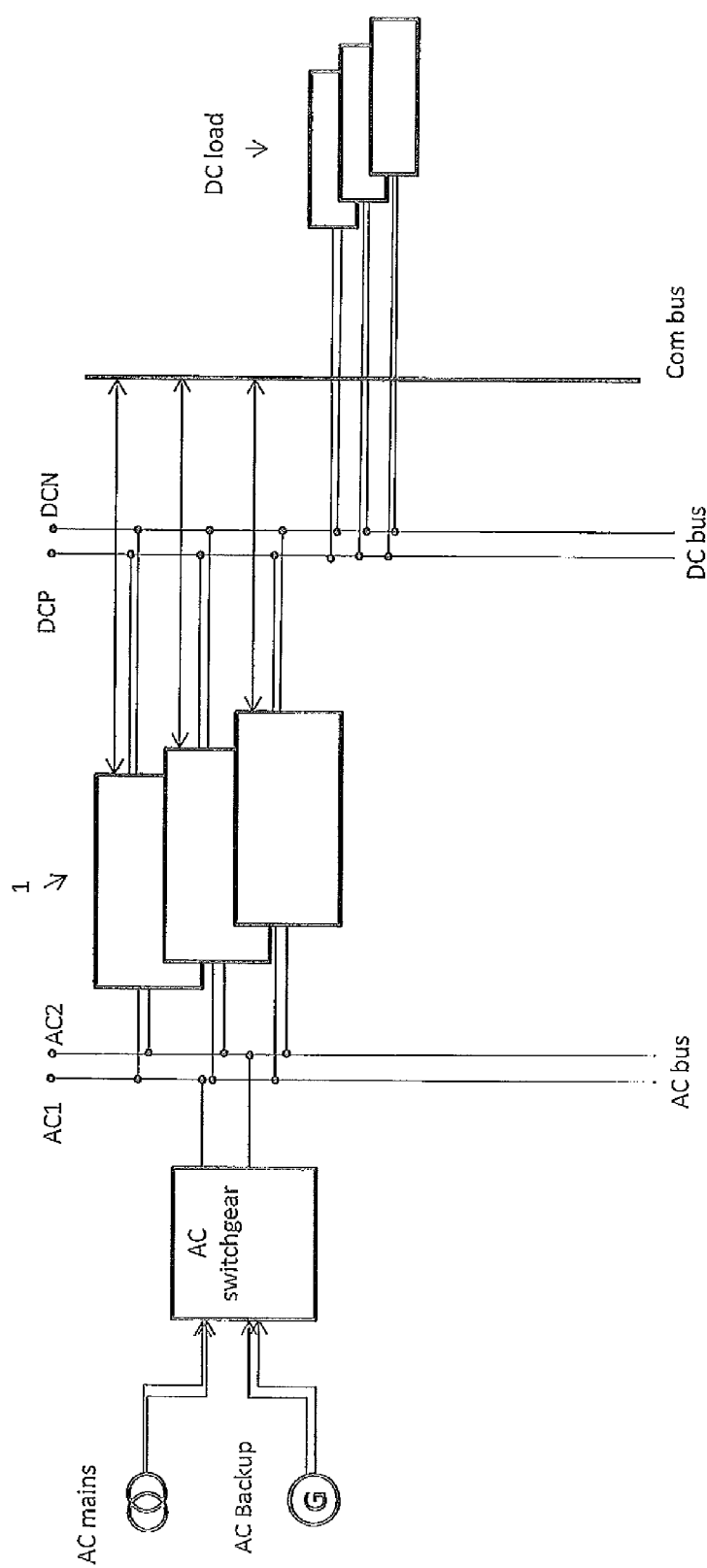
FIG. 7 illustrates a power supply system according to the present invention connected to several loads.

It is now referred to FIG. 7. Here it is shown schematically how power supply system modules 1 according to the invention can be arranged into a power supply system. When comparing FIG. 7 with the prior art power supply system of FIG. 2, it is clear that the power supply system using the modules 1 is significantly simplified, it takes less space and require less time to be installed, there is also a reduction in connectors, cables, etc. This again ensures easier logistics for the operators of the power supply system and it is also easier to scale up/down by inserting more modules 1 or removing modules 1.

By having the battery device 21 provided in the respective housing 2 of each module 1, there will be a distance between each battery device 21. Hence, a chain reaction of one exploding or burning battery device 21 causing several other battery devices 21 to explode or catch fire is reduced.

Moreover, a proper balance of needed backup battery devices 21 is also achieved, since each module 1 contains sufficient backup battery power for its nominal power.

The invention claimed is:
1. A power supply system module, comprising:
first and second AC terminals;
positive and negative DC terminals;
a housing;
an AC-DC converter connected to the first and second AC terminals;
a DC-DC converter connected between the AC-DC converter and an internal DC bus;
a protection circuit connected between the internal DC bus and the positive or negative DC terminal;
a control device provided for controlling the AC-DC converter and/or the DC-DC converter;
wherein the AC-DC converter, the DC-DC converter and the control device are provided inside the housing;
wherein the power supply system module further comprises a backup battery device comprising a backup battery connected to the internal DC bus via a battery management system, where the backup battery device is provided inside the housing;
wherein the power supply system module comprises a cooling fan for blowing air through the housing, where the backup battery is cooled by the cooling fan,
wherein the backup battery is provided in a first compartment provided within the housing, where the cooling fan is blowing air through the first compartment and
wherein the AC-DC converter, the DC-DC converter and/or the control device are provided in a second compartment, where the second compartment is separated from the first compartment by a protective wall.
2. The power supply system module according to claim 1, wherein the battery management system is connected to the control device.
3. The power supply system module according to claim 1, wherein the battery management system comprises a battery monitoring and control system for monitoring the status of the backup battery and for controlling the current flow between the backup battery and the internal DC bus.
4. The power supply system module according to claim 3, wherein the battery monitoring and control system is connected to the control device.
5. The power supply system module according to claim 3, wherein the battery monitoring and control system comprises a voltage sensor, a current sensor and a temperature sensor, where the sensors are connected to the control device.
6. The power supply system module according to claim 3, wherein the battery monitoring and control system comprises a charge and/or discharge current control device for controlling the charge current supplied to the backup battery from the internal DC bus during charging and/or for controlling the discharge current supplied from the backup battery to the internal DC bus during discharging, where the charge and or discharge current control device is connected to the control device.

7. The power supply system module according to claim 1, where the battery management system comprises a battery safety system configured to disconnect the backup battery from the internal DC bus in case safety requirements are no longer fulfilled.

8. The power supply system module according to claim 7, wherein the battery safety system comprises a voltage sensor, a current sensor and a temperature sensor,
wherein the battery safety system further comprises a connect/disconnect device connected to the sensors, where connect/disconnect device are configured to:
disconnect the backup battery from the internal DC bus in case specified safety limits are no longer fulfilled and
reconnect the backup battery to the internal DC bus in case the safety requirements are fulfilled again.

9. The power supply system module (1) according to claim 7, wherein the battery safety system is independent of the control device and the battery monitoring and control system.

10. The power supply system module according to claim 1, wherein the backup battery is configured to supply a nominal power of the power supply system module in a period of more than 30 seconds.

11. The power supply system module according to claim 1, wherein the protective wall is made of sheet metal or aluminum.

12. The power supply system module according to claim 1, wherein the first compartment is a closed compartment with an air inflow opening provided by the cooling fan and an air exit opening.

13. The power supply system module according to claim 1, wherein an expected lifetime for the backup battery is between 10-12 years and an expected lifetime for the AC-DC converter, the DC-DC converter and/or the control device is between 10-12 years.

14. The power supply system module according to claim 13, wherein the cooling fan is also blowing air through the second compartment of the housing.

15. The power supply system module according to claim 12, wherein a rear air exit opening is provided on the rear side of the first compartment of the housing.

16. The power supply system module according to claim 1, wherein:
the housing is configured to be mounted into a rack or cabinet;
the first and second AC terminals are guided through the housing and are configured to be connected to an AC bus provided in the rack or cabinet;
the positive and negative DC terminals are guided through the housing and are configured to be connected to a DC bus provided in the rack or cabinet.

17. The power supply system module according to claim 2, wherein the battery management system comprises a battery monitoring and control system for monitoring the status of the backup battery and for controlling the current flow between the backup battery and the internal DC bus.

18. The power supply system module according to claim 2, wherein the battery management system comprises a battery safety system configured to disconnect the backup battery from the internal DC bus in case safety requirements are no longer fulfilled.

19. The power supply system module according to claim 3, wherein the battery management system comprises a battery safety system configured to disconnect the backup battery from the internal DC bus in case safety requirements are no longer fulfilled.

20. The power supply system module according to claim 4, wherein the battery management system comprises a battery safety system configured to disconnect the backup battery from the internal DC bus in case safety requirements are no longer fulfilled.

* * * * *